US012794082B2

(12) United States Patent
Sadakane et al.

(10) Patent No.: US 12,794,082 B2
(45) Date of Patent: Nov. 10, 2026

(54) LITHIUM SECONDARY BATTERY

(71) Applicant: Panasonic Intellectual Property Management Co., Ltd., Osaka (JP)

(72) Inventors: Takuya Sadakane, Osaka Fu (JP); Hajime Nishino, Nara Ken (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 876 days.

(21) Appl. No.: 17/788,428

(22) PCT Filed: Dec. 1, 2020

(86) PCT No.: PCT/JP2020/044686
§ 371 (c)(1),
(2) Date: Jun. 23, 2022

(87) PCT Pub. No.: WO2021/131534
PCT Pub. Date: Jul. 1, 2021

(65) Prior Publication Data

US 2023/0042242 A1 Feb. 9, 2023

(30) Foreign Application Priority Data

Dec. 27, 2019 (JP) ................................ 2019-238407

(51) Int. Cl.
*H01M 50/449* (2021.01)
*H01M 4/02* (2006.01)
(Continued)

(52) U.S. Cl.
CPC ......... *H01M 50/449* (2021.01); *H01M 4/134* (2013.01); *H01M 10/0525* (2013.01);
(Continued)

(58) Field of Classification Search
CPC .. H01M 50/449; H01M 50/446; H01M 4/134; H01M 10/0525; H01M 10/44;
(Continued)

(56) References Cited

U.S. PATENT DOCUMENTS

2014/0370358 A1 12/2014 Hong et al.
2017/0104246 A1 4/2017 Takeda
(Continued)

FOREIGN PATENT DOCUMENTS

CN 101369645 A 2/2009
CN 105633326 A 6/2016
(Continued)

OTHER PUBLICATIONS

Office Action dated Jun. 27, 2024, issued in counterpart CN application No. 202080089476.0, with Partial English translation. (11 pages).

(Continued)

*Primary Examiner* — Basia A Ridley
*Assistant Examiner* — Heng M. Chan
(74) *Attorney, Agent, or Firm* — WHDA, LLP

(57) ABSTRACT

A lithium secondary battery includes a positive electrode, a negative electrode, a separator disposed between the positive electrode and the negative electrode, and a nonaqueous electrolyte. The negative electrode is an electrode in which lithium metal deposits during charging and the lithium metal dissolves during discharging, the separator includes a substrate, a first layer disposed on a first side of the substrate, and a second layer disposed on a second side of the substrate, the first layer includes particles of phosphate containing lithium, the second layer includes a polymer and/or inorganic particles other than the particles of the phosphate, and the polymer is at least one selected from the (Continued)

group consisting of aromatic polyamide, aromatic polyimide, and aromatic polyamide-imide.

10 Claims, 2 Drawing Sheets

(51) Int. Cl.
*H01M 4/134* (2010.01)
*H01M 10/0525* (2010.01)
*H01M 10/44* (2006.01)
*H01M 50/446* (2021.01)

(52) U.S. Cl.
CPC ......... *H01M 10/44* (2013.01); *H01M 50/446* (2021.01); *H01M 2004/027* (2013.01)

(58) Field of Classification Search
CPC ......... H01M 2004/027; H01M 10/052; H01M 10/0568; H01M 50/409; Y02E 60/10
See application file for complete search history.

(56) References Cited

U.S. PATENT DOCUMENTS

| | | | | |
|---|---|---|---|---|
| 2018/0048017 | A1* | 2/2018 | Jilek | H01M 10/46 |
| 2019/0267596 | A1* | 8/2019 | Guo | C08L 77/06 |
| 2020/0203693 | A1 | 6/2020 | Sugimori et al. | |
| 2020/0243827 | A1 | 7/2020 | Morikawa et al. | |
| 2020/0251744 | A1 | 8/2020 | Takada et al. | |

FOREIGN PATENT DOCUMENTS

| | | | |
|---|---|---|---|
| CN | 107093693 | A | 8/2017 |
| CN | 108807818 | A | 11/2018 |
| JP | 2001-243957 | A | 9/2001 |
| JP | 2012-128979 | A | 7/2012 |
| JP | 2013-114764 | A | 6/2013 |
| JP | 2015-505137 | A | 2/2015 |
| JP | 2016072120 | A * | 5/2016 |
| JP | 2017-76484 | A | 4/2017 |
| WO | 2019/044308 | A1 | 3/2019 |
| WO | 2019/107067 | A1 | 6/2019 |
| WO | 2019/107068 | A1 | 6/2019 |

OTHER PUBLICATIONS

International Search Report dated Feb. 9, 2021, issued in counterpart International Application No. PCT/JP2020/044686 (2 pages).

* cited by examiner

LITHIUM SECONDARY BATTERY

TECHNICAL FIELD

The present disclosure relates to lithium secondary batteries.

BACKGROUND ART

Nonaqueous electrolyte secondary batteries such as a lithium ion battery may generate abnormal heat due to an inner short circuit or the like. In lithium ion batteries, when an abnormal heat is generated due to an inner short circuit or the like, the batteries may further generate heat due to ionic conduction between the positive and negative electrodes. As one of measures to suppress such further heat generation, separators having a shutdown function has been used.

The separator having the shutdown function is melted when abnormal heat generation occurs, and as a result, the pores of the separator are closed. The closing of the separator pores blocks ion conduction (e.g., lithium ion conduction) between the positive and negative electrodes and suppresses further heat generation.

Nonaqueous electrolyte secondary batteries using a separator to suppress the heat generation of the batteries in abnormal situation has been proposed Patent Literature 1).

In nonaqueous electrolyte secondary batteries, it is common to use a material (e.g., graphite or the like) which can store and release lithium ions reversibly as a negative electrode active material. Meanwhile, lithium secondary batteries have also been proposed in which lithium metal deposits on a negative electrode current collector during charging and lithium metal dissolves during discharging (e.g., Patent Literature 2).

CITATION LIST

Patent Literature

PLT 1: WO 2019/044308

PLT2: Japanese Laid-Open Patent Publication No. 2001-243957

SUMMARY OF INVENTION

As a result of investigation by the inventors of the present application, it has been found that there is a demand for a new separator having high effect on suppressing heat generation in abnormal situation in a lithium secondary battery in which lithium metal deposits on a negative electrode current collector.

One aspect of the present disclosure relates to a lithium secondary battery. The lithium secondary battery includes a positive electrode, a negative electrode, a separator disposed between the positive electrode and the negative electrode, and a nonaqueous electrolyte, wherein the negative electrode is an electrode in which lithium metal deposits during charging and the lithium metal dissolves during discharging; the separator includes a substrate, a first layer disposed on a first surface of the substrate, and a second layer disposed on a second surface of the substrate; the first layer includes particles of phosphate containing lithium; the second layer includes a polymer and/or inorganic particles other than the particles of the phosphate, and the polymer is at least one selected from the group consisting of aromatic polyamide, aromatic polyimide, and aromatic polyamide-imide.

According to the disclosed embodiment, in lithium secondary batteries in which lithium metal deposits on the negative electrode during charging, an increase in the temperature of the battery in abnormal state can be suppressed.

DESCRIPTION OF EMBODIMENTS

Figure 1:
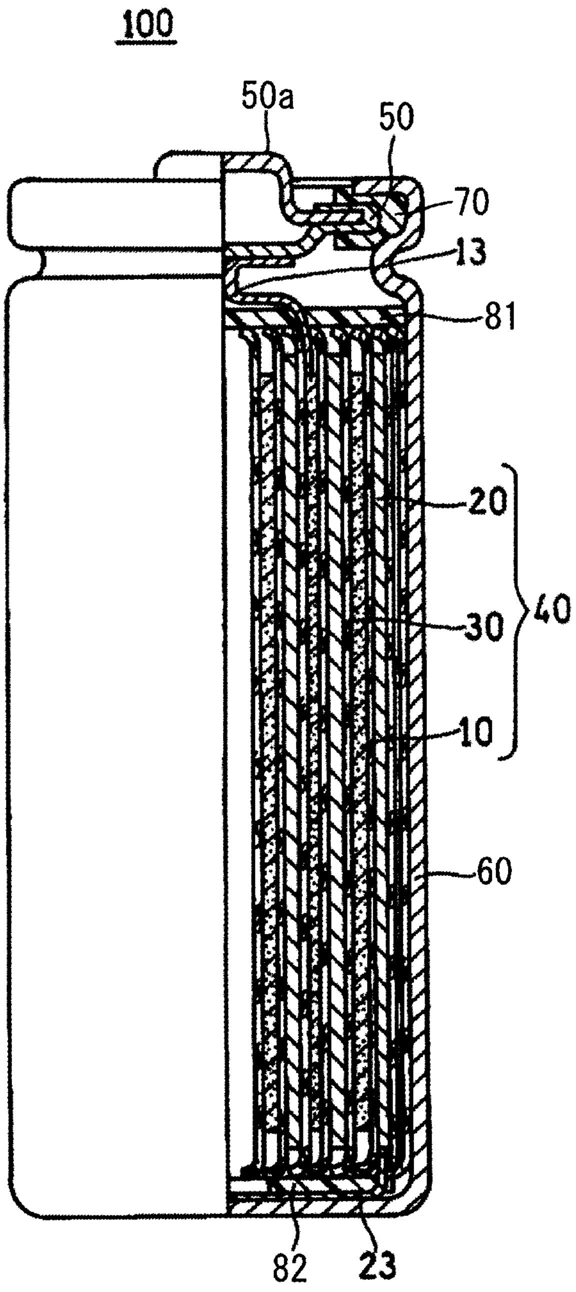
FIG. 1 is a partially exploded cross-sectional view schematically showing an exemplary lithium secondary battery of the present embodiment.

Embodiments of the present disclosure will be described below. In the following description, embodiments of the present disclosure will be described in detail with reference to examples. The present disclosure, however, is not limited to the following examples. In the following description, specific numerical values and materials may be exemplified, but other numerical values and other materials may be used as long as the effect of the present disclosure is obtained. In the following description, unless otherwise noted, the phrase "main component" means a component having the highest content (content on a mass basis) in the composition or the member (layer, film, substrate, or base). The content of the main component may be 50 mass % or more.

As a result of investigation, the inventors of the present application have found that a new separator is required to replace the conventional separator having a shutdown function in order to further suppress heat generation in abnormal state in a lithium secondary battery in which lithium metal deposits on a negative electrode current collector. As a result of further investigation, the present inventors have found that by using a separator having a specific structure, an effect of suppressing heat generation in abnormal state can be enhanced. The present disclosure is based on these new findings.

(Lithium Secondary Battery)

A lithium secondary battery of the present embodiment includes a positive electrode, a negative electrode, a separator disposed between the positive electrode and the negative electrode, and a nonaqueous electrolyte. In the negative electrode, lithium metal deposits during charging and lithium metal is dissolved during discharging. The separator includes a substrate, a first layer disposed on a first surface of the substrate, and a second layer disposed on a second surface of the substrate. The second surface is a surface opposite the first surface. The first layer contains particles of phosphate that contains lithium. In the following, the particle of phosphate containing lithium may be referred to as "phosphate particle (P)" or "particle (P)". The second layer includes a polymer and/or inorganic particles other than the phosphate particles. The polymer is at least one selected from the group consisting of aromatic polyamide, aromatic polyimide, and aromatic polyamide-imide. This polymer may be referred to as "polymer (PL)" in the following. In addition, the inorganic particles other than the phosphate particles may be referred to as "inorganic particles (F)".

(Separator)

The separator is a sheet-form member having ion permeability and insulating properties as a whole. The substrate of the separator is also a sheet-like member having ion permeability and insulating properties. The substrate of the separator may be a laminate of a plurality of sheets including sheets having ion permeability and insulating properties.

For the substrate of the separator, a substrate known as a substrate for lithium secondary batteries may be used. The substrate of the separator may be a microporous film, a woven fabric, or a nonwoven fabric. Examples of the material of the substrate of the separator include a polymer having insulating properties, and include, specifically, polyolefin, polystyrene, polyester, cellulose, and a polymer containing these as a basic skeleton. Examples of the polyolefin include polyethylene, polypropylene, a copolymer of ethylene and α-olefin, and the like. The substrate of the separator may contain polyolefin as a main component, or may be composed only of polyolefin.

(First Layer)

Out of the two sides of the substrate (the first and second sides), the first layer may be laminated to a positive electrode side or to a negative electrode side. In a typical example, the separator is composed only of a substrate, a first layer, and a second layer.

The phosphate constituting the phosphate particles (P) may be at least one selected from the group consisting of lithium phosphate ($Li_3PO_4$), lithium hydrogen phosphate ($Li_2HPO_4$), and dihydrogen phosphate ($LiH_2PO_4$). From the viewpoint that it is highly effective to suppress the heat generation in batteries at the time of these abnormalities, in particular, lithium phosphate is preferable.

The first layer may usually contain the particles (P) as a main component. The content of the particles (P) in the first layer may be in the range of 50 mass % to 99 mass %, may be in the range of 85 mass % to 99 mass %, or may be in the range of 90 mass % to 98 mass %. The content may be 50 mass % or more, 70 mass % or more, 85 mass % or more, or 90 mass % or more. The content may be 99 mass % or less, 98 mass % or less, or 95 mass % or less. When the content is in these ranges, the particles P have a sufficient surface area and lithium is easily deactivated at high temperatures.

The average particle size of the particles (P) may be in the range of 0.1 μm to 1.0 μm (e.g., in the range of 0.1 μm to 0.5 μm, in the range of 0.1 μm to 0.2 μm, or in the range of 0.1 μm to 0.19 μm). The average particle size of the particles (P) may be 0.1 μm or more, or 0.15 μm or more. The average particle size of the particles (P) may be 1.0 μm or less, 0.5 μm or less, 0.3 μm or less, or 0.2 μm or less. By setting the average particle size to 0.1 μm or more, it is possible to ensure sufficient pores for immersion in the electrolytic solution. Preferably, the average particle size is 1.0 μm or less in view of forming a layer with highly dense particles (P). The average particle size of the particles (P) is a median diameter ($D_{50}$) at which the cumulative volume is 50% in the volume-based particle size distribution, and is measured by a laser diffraction method (laser diffraction/scattering particle size distribution measuring device). In this specification, a median diameter or an average particle size means a volume-based median diameter unless otherwise specified.

The first layer may include a solid component other than the particles (P). For example, the first layer may contain a binder, an inorganic material other than the particles (P) (e.g., inorganic particles), and the like. Further, the first layer may further include a polymer (PL) to be described later.

When the first layer contains a binder, the content of the binder in the first layer may be in the range of 1 mass % to 15 mass %, or may be in the range of 2 mass % to 10 mass %. The content of the binder in the first layer may be 1 mass % or more, or 2 mass % or more. The content of the binder in the first layer may be 15 mass % or less, or 10 mass % or less.

Examples of the binder contained in the first layer include polyolefins (polyethyl polypropylene, a copolymer of ethylene and α-olefin, and the like), fluorine-containing resins (polyvinylidene fluoride, polytetrafluoroethylene, polyvinyl fluoride, and the like), fluorine-containing rubbers (vinylidene fluoride-hexafluoropropylene-tetrafluoroethylene copolymer, ethylene-tetrafluoroethylene copolymer, and the like), styrene-butadiene copolymers and hydrides thereof, acrylonitrile-butadiene copolymers and hydrides thereof, and acrylonitrile-butadiene-styrene copolymers and hydrides thereof. Furthermore, examples of the binder contained in the first layer include a methacrylate-acrylate copolymer, styrene-acrylate copolymer, acrylonitrile-acrylate copolymer, polyvinyl acetate, polyphenylene ether, polysulfone, polyether sulfone, polyphenylene sulfide, polyetherimide, polyamideimide polyamide, poly(N-vinyl acetamide), polyester, polyacrylonitrile, cellulose, ethylene-vinyl acetate copolymer, polyvinyl chloride, isoprene rubber, butadiene rubber, polymethyl acrylate, polyethyl acrylate, polyvinyl alcohol, carboxymethyl cellulose, acrylamide, methyl cellulose, guar gum, sodium alginate, carrageenan, and xanthan gum. In addition, among the above-mentioned binders, salts may be used for those forming salts.

(Second Layer)

As described above, the second layer contains a polymer (PL), or contains inorganic particles (F) other than the phosphate particles (P), or both. The second layer may or may not contain the phosphate particles (P).

The polymer (PL) is preferable because it has high heat resistance. The polymer (PL) may be composed of only a kind of polymer, or may contain a plurality of kinds of polymer. The content of the polymer (PL) in the second layer may be in the range of 50 mass % to 100 mass % (e.g., in the range of 80 mass % to 100 mass % or 90 mass % to 100 mass %). The second layer may be composed of only polymer (PL). Alternatively, the second layer may contain a polymer (PL) and a polymer other than the polymer (PL), may contain inorganic particles, or may contain other solid components.

Examples of the aromatic polyamide (polymer (PL)) include a polymer formed by condensation polymerizing a monomer having an aromatic skeleton and including an amide bond in the repeating unit. Examples of the aromatic polyamide (e.g., fully aromatic polyamide) include meta-aromatic polyamides (e.g., meta-fully aromatic polyamides) and para-aromatic polyamides (e.g., para-fully aromatic polyamides). The fully aromatic polyamide is also called aramid.

The meta-aromatic polyamide is an aromatic polyamide h zigzag molecular skeleton. The meta-aromatic polyamide is, for example, a polymer in which meta-positions or positions corresponding to the meta-positions in aromatic skeletons in the monomers are bonded by amide bonds. Examples of atomic groups having bonding positions at the meta-positions or the positions corresponding to the meta-positions include 1,3-phenylene, 3,4'-biphenylene, 1,6-naphthalene, 1,7-naphthalene, 2,7-naphthalene, and the like.

The meta-aromatic polyamide is obtained by condensation polymerization of an aromatic diamine to which amino group ($-NH_2$) is bonded at the meta-positions or positions corresponding to the meta-positions, and an aromatic dicarboxylic acid dichloride to which "—COCl" is bonded at the meta-positions or positions corresponding to the meta-positions. Examples of the meta-aromatic polyamide include polymetaphenylene isophthalamide, poly(metabenzamide), poly(3,4'-benzanilide isophthalamide), poly(metaphenylene-3,4'-biphenylene dicarboxylic acid amide), poly (metaphenylene-2,7-naphthalene dicarboxylic acid amide), and the like.

The para-aromatic polyamide is, for example, a polymer in which para-positions or positions corresponding to the para-positions in aromatic skeletons in the monomers are bonded by amide bonds. Examples of atomic groups having bonding positions at the para-positions or the positions corresponding to the para-positions include 4,4'-biphenylene, 1,5-naphthalene, 2,6-naphthalene, and the like.

The para-aromatic polyamide is obtained by condensation polymerization of an aromatic diamine to which amino group ($—NH_2$) is bonded at the para-positions or the positions corresponding to the para-positions, and an aromatic dicarboxylic acid dichloride to which "—COCl" is bonded at the para-positions or the positions corresponding to the para-positions. Examples of the para-aromatic polyamide include poly(paraphenylene terephthalamide), pobparabenzamide), poly(4,4'-benzanilide terephthalamide), poly(paraphenylene-4,4'-biphenylenedicarboxylic acid amide), poly (paraphenylene-2,6-naphthalenedicarboxylic acid amide), poly(2-chloro-paraphenyleneterephthalamide), and the like. Examples of the aromatic polyamide also include a copolymer of paraphenylenediamine, 2,6-dichloroparaphenylenediamine, and terephthalic acid dichloride and the like.

Examples of the aromatic polyimide (polymer (PL)) include a polymer that is formed by condensation polymerizing a monomer having an aromatic skeleton and that includes an imide bond in the repeating unit. The aromatic polyimide is, for example, obtained by condensation polymerization of an aromatic diamine and an aromatic compound which is tetracarboxylic dianhydride. Examples of the aromatic compound which is a tetracarboxylic dianhydride include pyromellitic dianhydride, 3,3',4,4'-diphenylsulfonic tetracarboxylic dianhydride, 3,3',4,4'-benzophenone tetracarboxylic dianhydride, 2,2'-bis(3,4 dicarboxyphenyl) hexafluoropropane, 3,3',4,4'-biphenyltetracarboxylic dianhydride, and the like. Examples of the aromatic diamines include 4,4'-diaminodiphenyl ether, paraphenylenediamine, 3,3'-methylenedianiline, 3,3'-diaminobenzophenone, 3,3'-diaminobenzosulfone and the like.

Examples of the aromatic polyamide-imide (polymer (PL)) include a polymer that is formed by condensation polymerizing a monomer having an aromatic skeleton and that includes amide bonds and imide bonds. The aromatic polyamide-imide is obtained by condensation polymerization of an aromatic diisocyanate and an aromatic compound (A) which is tricarboxylic anhydride. Furthermore, the aromatic polyamide-imide is also obtained by condensation polymerization of an aromatic diamine and an aromatic compound (B) in which carboxylic anhydride group (two carboxyl groups dehydrated and condensed) and "–COCl" are bonded to an aromatic ring.

Examples of the aromatic compound (A) include trimellitic anhydride and the like. Examples of the aromatic diisocyanate include 4,4'-diphenylmethanediisocyanate, 2,4-tolylenediisocyanate, 2,6-tolylenediisocyanate, m-xylenediisocyanate, and the like. Examples of the aromatic compound (B) include trimellitic anhydride chloride and the like. Examples of the aromatic diamine include the aromatic diamines described above.

The aromatic polyamide, aromatic polyimide, and aromatic polyamide-imide are known as highly heat-resistant polymers (polymers or resins in another aspect). In view of heat resistance, aramids, i.e., meta-aramids (meta-fully aromatic polyamides) and para-aramids (para-fully aromatic polyamides) are preferably used. A preferred example of the polymer (PL) is a meta-aramid. Known aromatic polyamides, aromatic polyimides, and aromatic polyamide-imides may be used for the polymer (PL).

Usually, a polymer having a higher heat resistance than the main component of the separator substrate (e.g., polymer described above) is selected for the polymer (PL). Aromatic polyamides, aromatic polyimides, and aromatic polyamide-imides are usually more heat resistant than the polymers exemplified above as materials for the separator substrate.

As described above, the second layer may contain inorganic particles (F) other than the particle (P). Preferably, the inorganic particles (F) are made of an inorganic material with a higher melting point than the particle (P).

A preferred example of the inorganic particles (F) is a particle composed of an insulating inorganic compound that does not melt and decompose upon abnormal heating of the battery. The inorganic particles (F) may be inorganic particles which are generally used as an inorganic filler. Examples of materials of the inorganic particles (F) include oxides, hydrates of oxides, hydroxides, nitrides, carbides, sulfides, and the like, which may be those containing metal elements. The volume-based median diameter ($D_{50}$) of the inorganic particles (F) may be 0.2 μm or more and 2 μm or less.

Examples of the oxide and the hydrate of oxide include aluminum oxide (alumina), boehmite ($Al_2O_3H_2O$ or AlOOH), magnesium oxide, titanium oxide, zirconium oxide, silicon oxide, yttrium oxide, zinc oxide, and the like. Examples of the nitride include silicon nitride, aluminum nitride, boron nitride, titanium nitride, and the like. Examples of the carbide include silicon carbide, boron carbide, and the like. Examples of the sulfide include barium sulfate and the like. Examples of the hydroxide include aluminum hydroxide and the like. In the case of a substance (for example, boehmite) which melts after being modified into alumina, its melting point after modification is preferably higher than the melting point of the particles (P).

The material of the inorganic particles (F) may be a porous aluminosilicate such as zeolite, a layered silicate such as talc, barium titanate ($BaTiO_3$), strontium titanate ($SrTiO_3$), or the like. From the viewpoint of insulation and heat resistance, at least one selected from the group consisting of aluminum oxide, boehmite, talc, titanium oxide, and magnesium oxide may be used as the material of the inorganic particles (F).

The second layer may contain the inorganic particles (F) as a main component. The content of the inorganic particles (F) in the second layer may be in the range of 50 mass % to 99 mass % (e.g., in the range of 85 mass % to 99 mass %). In addition, in this case, the second layer may contain a binder. For the binder, the binder exemplified in the description of the first layer can be used. The content of the inorganic particles (F) in the second layer may be 50 mass % or more, 70 mass % or more, 85 mass % or more, or 90 mass % or more. The content may be 99 mass % or less. 98 mass % or less, or 95 mass % or less.

The first and second layer thicknesses may each independently be in the range of 0.2 μm to 10 μm (e.g., in the range of 1 μm to 8 μm, in the range of 2 μm to 4 μm or in the range of 4 μm to 10 μm). For example, the thickness of the first layer may be in the range of 0.2 μm to 10 μm and the thickness of the second layer may be in the range of 0.2 μm to 10 μm. The thickness of the first layer may be 0.2 μm or more, may be 0.3 μm or more, may be 0.5 μm or more, preferably 1 μm or more, more preferably 2 μm or more, more preferably 3 μm or more, further more preferably 4 μm or more. The thickness of the first layer may be 10 μm or less, 8 μm or less, may be 7 μm or less, or may be 5 μm or less. The thickness of the second layer may be 0.2 μm or more, may be 0.3 μm or more, may be 0.5 μm or more, preferably 1 μm or more, more preferably 2 μm or more, more preferably 3 μm or more, further more preferably 4 μm or more. The thickness of the second layer may be 10 μm or less, 8 μm or less, or 7 μm or less, 5 μm or less. When the thickness of at least one of the first layer and second layer is 0.2 μm or more, it is advantageous in suppressing an increase in battery temperatures in an abnormal state. When the thickness of at least one of the first layer and second layer is 10 μm or less, it is advantageous in terms of electric characteristics of batteries.

The porosity of the separator may be the range of 30% to 70%. Similarly, the porosity of each layer (substrate, first layer, second layer) constituting the separator may be in the range of 30% to 70%, respectively. The porosity is determined by the formula below.

$$\text{Porosity (\%)}=100-(100\times\rho_1/\rho_0)$$

[$\rho_0$ shows the density of the layer in the absence of pores. $\rho_0$ may be obtained from the physical property value of the constituent material, or may be obtained by forming a layer so as not to form pores, and measuring the thickness, area, and weight of the layer. $\rho_1$ represents the density of the member actually measured. $\rho_1$ may be determined by measuring the thickness, area, and weight of the member.]

A preferred exemplary separator satisfies all of conditions (1) to (4) below.

(1) Particles (P) are lithium phosphate. The content of the particles of lithium phosphate in the first layer is in the range of 85 mass % to 99 mass %.

(2) The content of the polymer (PL) in the second layer is 80 mass % to 100 mass % (e.g., range of 90 mass % to 100 mass %). The polymer (PL) is preferably a fully aromatic polyamide (aramid), and is, for example, a meta-fully aromatic polyamide (meta-aramid).

(3) The first and second layer thicknesses are each in the ranges described above.

The separator of the above preferable examples may further satisfy the conditions below.

(4) The average particle size of the particles (P) is in the range of 0.1 μm to 1.0 μm (e.g., in the above range).

The lithium secondary battery of the present embodiment uses, as a negative electrode, a negative electrode in which lithium metal deposits on the negative electrode current collector directly or through other layers during charging. When such a negative electrode in which lithium metal deposits in the negative electrode, the rise in temperature is more likely to be accelerated when battery temperature abnormally rises, compared with the case where a negative electrode in which no lithium metal deposition occur is used. The cause is not clear at present, but it is presumed to be as follows. That is, when the battery temperature is abnormally increased, oxygen gas is released by decomposition of the positive electrode active material. The released oxygen-gas reaches the negative electrode and reacts with lithium metal of the negative electrode. Since the reactivity of lithium metal with oxygen gas is very high, it is considered that the rise in temperature is accelerated significantly by their reaction.

The separator includes a first layer containing the phosphate particles (P). This first layer makes it possible to suppress a further temperature increase when the battery temperature abnormally rises. The mechanism is not clear at present. One possibility is that the particles (P) react with lithium metal of the negative electrode when the battery temperature is abnormally increased, thereby reducing the reactivity of lithium metal surfaces.

The second layer can function as a heat-resistant layer. Therefore, it is considered that the second layer suppresses thermal shrinkage of the separator when the battery temperature is abnormally increased. The reason for the significant effects when the first layer and second layer are used is not clear at present, but the significant effects can be obtained as shown in the Examples by combining the first layer and second layer.

The separator can be made by forming the first and second layers on a substrate. The first layer can be formed, for example, by the following method. First, a slurry is formed by mixing a solid component containing the particles (P) with a liquid component (dispersion medium). Next, the slurry is applied to the substrate or second layer to form a coating film, and then the coating film is dried. In this manner, a first layer can be formed. There is no particular limitation on the liquid used for forming the slurry. Examples of such liquids include N-methyl-2-pyrrolidone and the like.

When the second layer contains the inorganic particles (F), the second layer may be produced in the same manner as the method for producing the first layer described above. If the second layer contains the polymer (PL), the second layer can be formed by, for example, the method below. First, a coating liquid is formed by mixing a solid component containing the polymer (PL) and particles (PM) with a liquid component (dispersion medium/solvent). Examples of the liquid component include N-methyl-2-pyrrolidone and the like. The particles (PM) are for forming pores in the second layer by removing the particles later. For the particles (PM), particles which are soluble in a solvent in which the polymer (PL) is not soluble can be used. Examples of the particles (PM) include lithium chloride, calcium chloride, and the like. Next, the coating liquid is applied to the substrate to form a coating film and then the coating film is dried. Then, the particles (PM) are dissolved and removed by washing the coating with a cleaning solution (e.g., water). In this manner, the second layer can be formed.

There is no particular limitation on the respective steps in forming the first and second layers, and known methods can be applied. The application of the slurry and the coating liquid may be performed, for example, by a known method such as a method using a bar coater. Further, drying may be performed by a known method such as drying by heating or natural diving.

(Negative Electrode)

The negative electrode is a negative electrode in which lithium metal deposits during charging and the lithium metal dissolves in the nonaqueous electrolyte during discharging. Upon charging, lithium metal deposits either directly on the negative electrode current collector or on the negative electrode current collector via the coating layer. In the following, a member of the negative electrode on which lithium metal deposits is sometimes referred to as a "negative electrode base". The negative electrode base includes at least a negative electrode current collector. The negative electrode base may be composed only of a negative electrode current collector, or may include a negative electrode current collector and a coating layer disposed on the negative electrode current collector. This negative electrode base may be used for manufacturing the lithium secondary battery of the present embodiment. The coating layer disposed on the negative electrode current collector will be described later.

The lithium metal deposited during charging may contain a trace amount of a component other than lithium. Lithium metal is mainly deposited on the surface that is a surface of the negative electrode and that faces the positive electrode. The deposited lithium metal originates from lithium ions released from the positive electrode into the nonaqueous electrolyte during charging. The lithium metal deposited on the negative electrode is dissolved again in the nonaqueous electrolyte during discharging. The lithium ions dissolved in the nonaqueous electrolyte are taken into the positive electrode during discharging.

The negative electrode current collector is composed of a conductive material (e.g., a metal material) excluding lithium metal and lithium-alloy. The negative electrode current collector may be composed of a metal material that does not react with lithium metal (that is, a metal material that does not form an alloy or intermetallic compound with lithium metal). Examples of such metal materials include copper (Cu), nickel (Ni), iron (Fe), stainless steel (SUS), and the like. The material constituting the negative electrode current collector may be copper.

The form of the negative electrode current collector is not particularly limited, and may be a porous or non-porous sheet (i.e., foil, film, etc.). The surface of the negative electrode current collector may have irregularities. When a foil containing copper is used as the negative electrode current collector, the foil thereof may contain copper as a main component or may be substantially composed of only copper. The thickness of the negative electrode current collector is not particularly limited, and may be, for example, in the range of 5 to 20 μm.

As described above, the negative electrode base may include a negative electrode current collector and a coating layer disposed on the negative electrode current collector. The coating layer may be a lithium metal layer. In other words, the lithium metal layer is disposed on the negative electrode current collector in advance. Then, lithium metal further deposits on the coating layer (lithium metal layer) by charging, and the lithium metal layer becomes thicker. There is no particular limitation on the method of disposing the lithium metal layer (coating layer) in advance on the negative electrode current collector. Lithium metal may be rolled into a foil by, for example, roll press and the lithium metal foil may be transferred onto the negative electrode current collector. Alternatively, lithium metal may be deposited on the negative electrode current collector.

The coating layer disposed on the negative electrode current collector may be a layer capable of storing lithium ions. This layer is sometimes referred to as a "lithium ion storage layer" in the following. The lithium ion storage layer stores lithium ions during charging. When this layer is filled with lithium ions, lithium ions deposit on the layer as lithium metal.

The lithium ion storage layer contains a material that is capable of storing lithium ions. As such a material, for example, a material used as the negative electrode active material of lithium ion batteries may be used. Specifically, a carbon material capable of reversibly storing and releasing lithium ions, a metal being alloyed with lithium, an inorganic compound storing lithium ions, and the like may be used. The carbon material is beneficial for its low-cost. Examples of the carbon material include natural graphite, artificial graphite, hard carbon, soft carbon, carbon black, and carbon nanotubes.

The coating layer may be a layer of a metal (including a semi-metal such as silicon) that can be alloyed with lithium. Examples of metals that form such metal layers include aluminum, zinc, silicon, tin, and the like.

Examples of the inorganic compound that stores lithium ions include oxides such as silicon compound and tin compound, spinel compounds such as lithium titanate, and the like.

When the lithium ion storage layer is formed using the particles of the material capable of storing lithium ions, a slurry containing the particles and a liquid component is prepared and the slurry is used to form the lithium ion storage layer. The slurry may optionally contain other materials (binder) and the like. As the binder, a binder used in the positive electrode to be described later or a known binder may be used. The lithium ion storage layer may be formed in the same manner as a general method of forming the negative electrode active material layer.

When the lithium ion storage layer is formed rising a carbon material or metal compound in the form of particles, the thickness of the lithium ion storage layer may be 5 μm or more, or may be 20 μm or less (e.g., 10 μm or less). When a metal layer is used as the lithium ion storage layer, the thickness of the lithium ion storage layer may be 0.01 μm or more, or may be 1 μm or less (e.g., 0.1 μm or less).

The transfer of electrons in the negative electrode during charging and discharging is mainly due to the deposition and dissolution of lithium metal in the negative electrode. Specifically, 70% to 100% (e.g., 80% to 100% or 90% to 100%) of the transfer of electrons (in other aspect, current) in the negative electrode during charging and discharging is due to the deposition and dissolution of lithium metal. In other words, the negative electrode of the present embodiment differs from the negative electrode in which the transfer of electrons in the negative electrode during charging and during discharging is mainly caused by the storage and release of lithium ions by the negative electrode active material (such as graphite). That is, the amount of lithium metal present in the coating layer and the amount of lithium ions that can be stored in the coating layer are sufficiently small compared with the amount of lithium metal deposited on the negative electrode by charging.

When the negative electrode includes the lithium ion storage layer, the open-circuit potential of the negative electrode at the time of full charge may be 70 mV or less relative to lithium metal (dissolution deposition potential of lithium). With the negative electrode having an open circuit potential of 70 mV or less relative to lithium metal, lithium metal deposits. Therefore, when the open-circuit potential of the negative electrode at the time of full charge is 70 mV or less relative to lithium metal it can be said that lithium metal exists on the surfaces of lithium ion storage layers at the time of full charge. That is, the negative electrode achieves a capacity by deposition and dissolution of lithium metal. Here, "fully charged" means, when the rated capacity of a battery is regarded as C, for example, a state in which the battery is charged until the state of charge of 0.98×C or more. The open-circuit potential of the negative electrode at the time of fall charge may be measured by decomposing a fully charged battery in an argon-atmosphere to take out the negative electrode, and assembling a cell with lithium metal as a counter electrode. The nonaqueous electrolyte of the cell may be the same as the nonaqueous electrolyte in the decomposed battery.

(Nonaqueous Electrolyte)

The nonaqeous electrolyte contains, for example, a nonaqueous solvent, and lithium ions and anions dissolved in the nonaqueous solvent. The nonaqueous electrolyte may be a liquid or a gel.

A liquid nonaqueous electrolyte is prepared by dissolving a lithium salt in the nonaqueous solvent. By dissolving the lithium salt in the nonaqueous solvent, lithium ions and anions are generated.

The gel nonaqueous electrolyte contains a lithium salt and a matrix polymer, or alternatively, a lithium salt, a nonaqueous solvent, and a matrix polymer. As the matrix polymer, for example, a polymer material which absorbs the nonaqueous solvent to be a gel is used. Examples of the polymer material include fluororesin, acrylic resin, and polyether resin.

As the lithium salt or anion, those known ones used for the nonaqueous electrolyte of lithium secondary batteries can be used. Specifically, examples of the anion include $BF_4^-$, $ClO_4^-$, $PF_6^-$, $CF_3SO_3^-$, $CF_3CO_2^-$, imides, oxalate complexes, and the like. The anions of imides include $N(SO_2CF_3)_2^-$, $N(C_mF_{2m+1}SO_2)_x(C_nF_{2n+1}SO_2)_y^-$ (m and n are each independently an integer of 0 or 1 or more, and x and y are each independently 0, 1, or 2, satisfying x+y=2), and the like. The anions of the oxalate complex may contain boron and/or phosphorus. Examples of the anions of the oxalate complex include bis(oxalate)borate anion, $BF_2(C_2O_4)^-$, $PF_4(C_2O_4)^-$, $PF_2(C_2O_4)_2^-$, and the like. The nonaqueous electrolyte may contain these anions singly or may contain two or more.

The nonaqueous electrolyte may contain lithium ions and anions, and the anions may contain at least anions of the oxalate complex. The anions of the oxalate complex may be bis(oxalate)borate anions.

From the viewpoint of suppressing the deposition of lithium metal into a dendrite state, preferably, the nonaqueous electrolyte contains at least an anion of the oxalate complex. The interaction between the anion of the oxalate complex and the lithium facilitates uniform deposition of fine particle of lithium metal. Therefore, it becomes easy to suppress the local deposition of lithium metal. The anion of the oxalate complex and other anions may be used together. Other anions may be $PF_6^-$ and/or an anion of imides.

Examples of the non-aqueous solvents include esters, ethers, nitriles, amides, or halogen-substituted compounds thereof. The nonaqueous electrolyte may contain these nonaqueous solvents singly or may contain two or more. Examples of the halogen-substituted compounds include fluoride and the like.

Examples of the esters include carbonate, esters, carboxylic acid esters, and the like. Examples of the cyclic carbonic acid ester include ethylene carbonate, propylene carbonate, and fluoroethylene carbonate (FEC). Examples of the chain carbonic acid ester include dimethyl carbonate (DEC), ethyl methyl carbonate (EMC), and diethyl carbonate (DMC). Examples of the cyclic carboxylic acid ester include γ-butyrolactone and γ-valerolactone. Examples of the chain carboxylic acid ester include methyl formate, ethyl formate methyl propionate, and methyl fluoropropionate.

As the ether, cyclic, ethers and chain ethers can be used. Examples of the cyclic ethers include 1,3-dioxolane, 4-methyl-1,3-dioxolane, tetrahydrofuran, and 2-methyltetrahydrofuran. Examples of the chain ethers include 1,2-dimethoxyethane, diethyl ether, ethyl vinyl ether, methyl phenyl ether, benzyl ethyl ether, diphenyl ether, dibenzyl ether, 1,2-diethoxyethane, diethylene glycol dimethyl ether, and the like.

The concentration of the lithium salt in the nonaqueous electrolyte is, for example, 0.5 mol/L or more and 3.5 mol/L or less. The concentration of the anion in the nonaqueous electrolyte may be 0.5 mol/L or more and 3.5 mol/L or less. The concentration of the anion of the oxalate complex in the nonaqueous electrolyte may be 0.05 mol/L or more and 1 mol/L or less.

The nonaqueous electrolyte may contain an additive. The additive may be one which forms a coating on the negative electrode. By forming a coating derived from the additive on the negative electrode, formation of dendrite tends to be suppressed. Examples of such an additive include vinylene carbonate, FEC, vinyl ethyl carbonate (VEC), etc.

(Positive Electrode)

The positive electrode includes, for example, a positive electrode current collector and a positive electrode active material layer disposed on the positive electrode current collector. The positive electrode active material layer contains a positive electrode active material, and further includes other materials (e.g., a conductive material, a binder, and the like) as necessary. Known materials may be used for the other materials. The positive electrode active material layer may be disposed on only one side of the positive electrode current collector or may be disposed on both sides. The positive electrode can be formed by, for example, the following method. First, a positive electrode mixture slurry containing a positive electrode active material and other material (e.g., a conductive material and a binder) is prepared. Next, the slurry is applied to the surface (one or both surfaces) of the positive electrode current collector to form a laminate including the positive electrode current collector and the coating film. Next, the coating film of the laminate is dried and then the laminate is rolled. The positive electrode is obtained in this manner.

Examples of the positive electrode active material include a layered rock salt type composite oxide. Examples of the layered rock salt type composite oxide include $Li_aCoO_2$, $Li_aNiO_2$, $Li_aMnO_2$, $Li_aCo_bM_{1-b}O_c$ (M is at least one selected from the group consisting of Na, Mg, Sc, Y, Mn, Fe, Ni, Cu, Zn, Al, Cr, Pb, Sb, and B), $LiMPO_4$ (M is at least one selected from the group consisting of Na, Mg, Sc, Y, Mn, Fe, Co, Ni, Cu, Zn, Al, Cr, Pb, Sb, and B), and the like. Here, $0<a\leq 1.1$, $0\leq b\leq 0.9$, and $2\leq c\leq 2.3$ are satisfied. Note that the value "a" indicating the molar ratio of lithium is increased or decreased by charging and discharging.

A composite oxide of the layered rock salt type containing nickel elements has advantages in terms of high capacity and low costs. Such a composite oxide is represented, for example, by the following general formula: $Li_aNi_xCo_yM_{1-x-y}O_2$. Cobalt is advantageous for extending the life of a battery.

The above general formula satisfies, for example, $0.97<a\leq 1.2$, $0.5\leq x\leq 1.0$, and $0\leq y\leq 0.1$. To increase the capacity, $0.8\leq x\leq 1.0$ may be satisfied. Here, M is, for example, at least one selected from the group consisting of Mn, Al, W, Mg, Mo, Nb, Ti, Si, and Zr. The use of aluminum for M is advantageous for improving the thermal stability. The atomic ratio Co/Al may be set to 0 to 1.0. It is to be noted that manganese, tungsten, niobium, magnesium, zirconium, and the like are considered to contribute to stabilization of the crystal structure.

Examples of the conductive material include carbon material such as carbon black (CB), acetylene black (AB), Ketjen black (KB), carbon nanotube (CNT), graphite, and the like. These may be used singly, or two or more kinds thereof may be used in combination.

Examples of the binder include fluororesins (polytetrafluoroethylene, polyvinylidene fluoride, and the like), polyacrylonitrile (PAN), polyimide resins, acrylic resins, polyolefin resins, and the like. These may be used singly, or two or more kinds thereof may be used in combination.

Examples of the material for the positive electrode current collector include metal materials such as Al, Ti, their alloys (such as Al alloys), and stainless steel (SUS). The positive electrode current collector can be, for example, in a form of a porous or non-porous sheet. The positive electrode current collector may be a sheet of a metal material, or may be, for example, a metal foil (i.e., metal film), a metal mesh, or the like. A carbon material such as carbon may be applied to the surface of the positive electrode current collector.

The lithium secondary battery of the present embodiment may have a cylindrical shape, a rectangular shape, or other shape. The lithium secondary battery of the present embodiment includes a battery case corresponding to its shape. A known battery case can be used for the battery case. The lithium secondary battery of the present embodiment may include other components (e.g., known components) as necessary.

An electrode group and a nonaqueous electrolyte are disposed in the battery case. The electrode group includes a positive electrode, a negative electrode, and a separator disposed between the positive electrode and the negative electrode. The electrode group is formed according to the shape of the battery. For example, in a cylindrical battery, the electrode group is typically formed by winding a positive electrode, a negative electrode, and a separator such that the separator is disposed between the positive electrode and the negative electrode.

There is no particular limitation on the method of manufacturing a lithium secondary battery of the present embodiment, and known techniques can be used as necessary. In an exemplary manufacturing process, first, an electrode group is formed. Next, the electrode group and a nonaqueous electrolyte are placed in a case of a battery case. As necessary, at an appropriate stage, one of the positive electrode and negative electrode is electrically connected to the case body and the other is electrically connected to a sealing member. Next, the case body is sealed using a gasket and the sealing member. In this way, a lithium secondary battery can be produced.

In the following, an example of the lithium secondary battery of the present embodiment will be described in detail with reference to the drawings. The above-described components can be applied to the components of the exemplary lithium secondary battery described in the following. In addition, the exemplary components described in the following can be changed based on the description above. Further, the items described in the following may be applied to the above-described embodiments.

Embodiment 1

FIG. 1 schematically shows a partially exploded cross-sectional view of an exemplary configuration of a lithium secondary battery of the present disclosure. A lithium secondary battery 100 shown in FIG. 1 is a cylindrical secondary battery.

The lithium secondary battery 100 is a wound-type battery and includes a wound type electrode group 40 and a nonaqueous electrolyte. The electrode group 40 includes a strip positive electrode 10, a strip negative electrode 20, and a separator 30. The separator 30 is disposed between the positive electrode 10 and the negative electrode 20. A positive electrode lead 13 is connected to the positive electrode 10. A negative electrode lead 23 is connected to the negative electrode 20.

One end portion of the positive electrode lead 13 is connected to the positive electrode 10, and the other end thereof is connected to a sealing member 50. The sealing member 50 includes a positive electrode terminal 50*a*. Generally, the sealing member 50 includes a mechanism that functions as a safety valve when the internal pressure of a battery increases.

One end of the negative electrode lead 23 is connected to the negative electrode 20, and the other end is connected to the bottom of a case 60 (case body). The case 60 functions as a negative electrode terminal. The case 60 is a bottomed cylindrical can. The case 60 is made of metal, for example, formed of iron. The inner surface of the iron case 60 is usually nickel-plated. At the upper and lower portions of the electrode group 40, an upper insulating ring 81 and a lower insulating ring 82 made of resin are disposed respectively. The electrode group 40 and a nonaqueous electrolyte are disposed inside the case 60. The case 60 is sealed by a sealing member 50 and a gasket 70.

Figure 2:
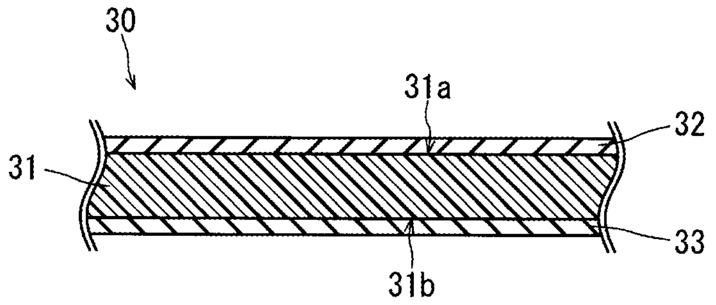
FIG. 2 is a cross-sectional view schematically showing an exemplary separator of the lithium secondary battery shown in FIG. 1.

An example of the separator 30 is shown in FIG. 2. The separator 30 includes a substrate 31, a first layer 32 disposed on one major surface (first surface 31*a*) of the substrate 31, and a second layer 33 disposed on the other major surface (second surface 31*b*) of the substrate 31. The first layer 32 and second layer 33 are the layer as described above. The first layer 32 may be disposed on the side facing the positive electrode 10, and the second layer 33 may be disposed on the side facing the negative electrode 20. Alternatively, the first layer 32 may be disposed on the side facing the negative electrode 20 and the second layer 33 may be disposed on the side facing the positive electrode 10.

Figure 3A:
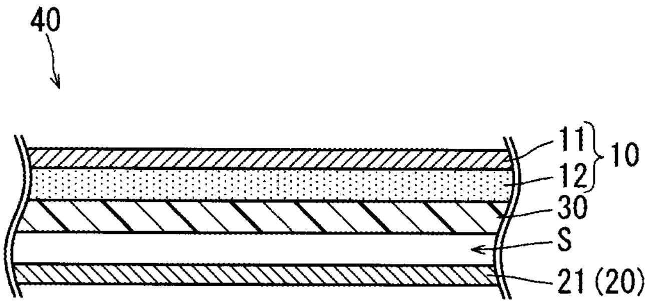
FIG. 3A is a cross-sectional view schematically showing an example of a state of a positive electrode, negative electrode, and separator immediately after battery assembly.

FIG. 3A schematically shows a state of a positive electrode 10, a negative electrode 20, and a separator 30 in an exemplary electrode group 40 immediately after battery assembly. The positive electrode 10 includes a positive electrode current collector 11 and a positive electrode active material layer 12 formed on the positive electrode current collector 11. The exemplary negative electrode 20 immediately after battery assembly is composed only of a negative electrode base 21. The negative electrode base 21 includes at least a negative electrode current collector, and may be composed only of a negative electrode current collector. In the example shown in FIG. 3A, a space S exists between the negative electrode base 21 and the separator 30, but the space S may exist elsewhere, or may not exist.

Figure 3B:
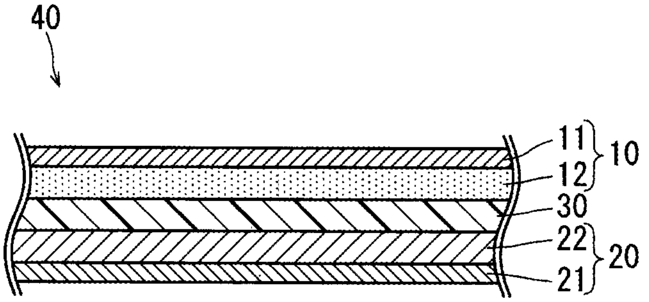
FIG. 3B is a cross-sectional view schematically showing an example of a state of a positive electrode, negative electrode, and separator after being charged.

FIG. 3B schematically shows the positive electrode 10, negative electrode 20, and separator 30 in the exemplary electrode group 40 after full charge. As shown in FIG. 3B, on the surface of the negative electrode base 21, lithium metal 22 is deposited. The deposition of the lithium metal 22 increases the volume of the negative electrode 20. At least a part of the deposited lithium metal 22 is discharged as lithium ions during discharging. In this manner, charging and discharging are repeated.

FIG. 1 shows a cylindrical lithium secondary battery with a wound electrode group. However, the lithium secondary battery of the present embodiment may be a lithium secondary battery of another form. For example, the lithium secondary battery of the present embodiment may have various shapes such as a cylindrical shape, a coin-shape (including a button shape), a rectangular shape, a sheet shape, and a flat shape, depending on its application and the like. The form of the electrode group is not particularly limited, and may be a wound type or a stack type. In addition, a known configuration may be applied to a configuration other than the configuration particular to the present embodiment.

Examples

A lithium secondary battery of the present embodiment will be explained in more detail based on Examples. In Examples, four types of lithium secondary batteries (batteries A1 and A2, battery C1, and battery R1) were prepared and evaluated.

(Battery A1)

As a substrate of the separator of the battery A1, a porous film made (thickness: 12 μm) of polyethylene was used. A separator of the battery A1 was obtained by forming a second layer and a first layer on this substrate.

The second layer was formed as below. First, N-methyl-2-pyrrolidone (NMP) and calcium chloride were mixed at a mass ratio of 94.2:5.8. The mixture was heated to about 80° C., and calcium chloride was completely dissolved. Then, the temperature of the solution was brought to room temperature, and 2200 g of the solution was collected, and then 0.6 mol of paraphenylenediamine (PPD) was added to be completely dissolved. While the solution was kept at about 20° C., 0.6 mol of terephthalic acid dichloride (TPC) was added in small portions. The resulting solution was aged for 1 hour at about 20° C. to serve as a polymerization solution. Next, 100 g of this polymerization solution and a N-methyl-2-pyrrolidone solution in which 5.8 mass % of calcium chloride was dissolved were mixed to obtain a solution (coating solution) in which the concentration of paraphenylene terephthalamide (PPTA) as an aromatic polyamide (aramid) was 2 mass %.

Next, the coating liquid was applied to one side of the substrate by a slot die method to form a coating film so that the thickness after drying would be 2 μm. Next, the substrate on which the coating film was formed was left in an atmosphere with a temperature of 25° C. and a relative humidity of 70% for 1 hour to allow aromatic polyamide to deposit. Next, NMP and calcium chloride in the coating film were removed by washing with water. Next, the coating film was dried at 60° C. for 5 minutes, thereby forming the second layer (thickness: 2 μm).

The first layer was formed as below. First, particles of lithium phosphate ($Li_3PO_4$) and poly(N-vinylacetamide) (PNVA) were mixed at a mass ratio of 100:8 to obtain a mixture. The particles of lithium phosphate used had a volume-based median diameter of 0.19 μm. A slurry (coating liquid) having a solid concentration of 12 mass % was prepared by adding water (ion-exchanged water) to the obtained mixture and stirring the mixture. Next, the slurry was applied by microgravure coating on the surface of the substrate opposing the surface on which the second layer was formed, thereby forming a coating film. Next, the coating film was dried by a drying oven installed in the coating machine. In this manner, the first layer (thickness: 2 μm) was formed. In this manner, the separator of the battery A1 was formed.

A positive electrode was prepared in the following manner. First, a slurry was prepared by mixing a positive electrode active material, acetylene black, and polyvinylidene fluoride at a mass ratio of 100:0.75:0.6, and further adding N-methyl-2-pyrrolidone and stirring the mixture. $LiNi_{0.9}Co_{0.05}Al_{0.05}O_2$ was used as the positive electrode active material. Next, coating films were formed by applying the slurry on both surfaces of the positive electrode current collector to obtain a laminate including the positive electrode current collector and the coating film. An aluminum foil was used as the positive electrode current collector. Next, the coating films of the laminate were dried and then the laminate was rolled by rollers to obtain the positive electrode.

A negative electrode was produced by cutting an electrolytic copper foil (thickness: 10 μm) into a predetermined electrode size.

A nonaqueous electrolyte was prepared in the following method. First, a solvent was prepared by mixing fluoroethylene carbonate (FEC), ethyl methyl, carbonate (EMC), and DMC (dimethyl carbonate) in a volume ratio of 20:5:75. In this solvent, $LiPF_6$ and $LiBF_2(C_2O_4)$ were dissolved so that the $LiPF_6$ concentration was 1 mol/L and the $LiBF_2(C_2O_4)$ concentration was 0.5 mol/L to prepare the nonaqueous electrolyte (nonaqueous electrolyte solution).

The battery A1 was prepared as below. First, a tab made of aluminum was attached to the positive electrode, and a tab made of nickel was attached to the negative electrode. Next, the positive electrode, negative electrode, and separator were arranged so that the separator was disposed between the positive electrode and the negative electrode, and they were spirally wound together. At this time, the separator was arranged so that the first layer (lithium phosphate containing layer) of the separator faced the positive electrode. In the batteries made below as well, the separator was similarly arranged so that the first layer faced the positive electrode. In this way, a wound electrode group was obtained. The electrode group was accommodated in a hag of outer package formed of a laminated sheet including an aluminum layer. After injecting the nonaqueous electrolyte into the outer package, the outer package was sealed to obtain the battery A1.

(Battery A2)

A battery A2 was made using the materials and method for the battery A1, except that the second layer was different.

The second layer of the battery A2 was formed as below. First, particles of aluminum oxide ($Al_2O_3$) and poly(N-vinylacetamide) (PNVA) were mixed at a mass ratio of 100:8 to obtain a mixture. The particles of aluminum oxide used had a volume-based median diameter of 0.42 μm. A slurry (coating liquid) having a solid concentration of 12 mass % was prepared by adding N-methyl-2-pyrrolidone to the obtained mixture and stirring the mixture. The slurry was then applied and dried in the same manner as in the first layer of the battery A1 to form a second layer (thickness: 2 μm) of the battery A2.

(Battery C1)

A battery C1 was made using the same materials and method for the battery A1, except that no first layer was formed. That is, the separator of the battery C1 is composed of a substrate and a second layer.

(Battery R1)

A battery R1 was made with the same materials and method for the battery A1, except that the negative electrode and the separator were different. The Battery R1 is a battery of Reference Example. The separator of the battery R1 was made with the same materials and method for the battery A1 except that no first layer was formed. That is, the separator of the battery R1 is composed of a substrate c a second layer.

For the negative electrode of the battery R1, negative electrode with no lithium metal deposition was used. Specifically, the negative electrode was prepared in the following manner. First, a slurry was prepared by mixing artificial graphite (negative electrode active material), sodium carboxy methylcellulose, and a powder of styrene-butadiene rubber in water at a solid component mass ratio of 98:1:1. Next, the slurry was applied to both surfaces of the negative electrode current collector made of copper foil to form coating films, thereby obtaining a laminate including the negative electrode current collector and the coating films. Copper foil (thickness: 8 μm) was used for the negative electrode current collector. Next, the coating films of the laminate were dried and then the laminate was rolled by rollers to obtain the negative electrode.

(Nail Penetration Test)

The above battery was charged at a constant current of 0.1 C under an environment of 2.5° C. until the battery voltage reached 4.3 V. Next, under an environment of 25° C., the charged sample was pierced with a tip of a wire nail (diameter: 1 mm) at a rate of 0.1 mm/sec into a center portion of a side surface thereof and the wire nail was stopped where the wire nail penetrated the case by 5 mm. Then, the generation rate of gases generated from the battery was measured at that time. The generation rate of the gas was calculated based on the differential value of the pressure measured by a pressure sensor. A part of the composition of each of the above-mentioned samples and the measurement result of the gas generation rate are shown in Table 1. In Table 1, “Deposits Li” in the Negative Electrode column indicates that the negative electrode is a type of electrode in which lithium metal deposits during charging.

TABLE 1

| | Negative Electrode | Main Material of First layer | Main Material of Second layer | Gas Generation Rate (%) |
|---|---|---|---|---|
| Battery A1 | Deposits Li | Lithium Phosphate | Aromatic Polyamide | 55.6 |
| Battery A2 | Deposits Li | Lithium Phosphate | $Al_2O_3$ | 63.9 |
| Battery C1 | Deposits Li | — | Aromatic Polyamide | 100.0 |
| Battery R1 | Graphite | — | Aromatic Polyamide | 13.0 |

The gas generation rate in Table 1 is the value when the gas generation rate of the battery C1 (the volume of gas generated per unit time) is set to 100%. It is considered that gas generation during the nail penetration test is caused by heat generation due to the reaction of lithium metal and oxygen gas released from the positive electrode and by the decomposition of the electrolyte solution. The higher the rate at which gas is generated, the higher the temperature of the battery in abnormal conditions.

As shown in Table 1, the battery C1 in which lithium metal deposits on the negative electrode had a higher gas generation rate than the battery R1 in which a negative electrode active material (graphite) that stores and releases lithium ions was used. This suggests that a separator that differs from the conventional shutdown separator is desirable in a lithium secondary battery in which lithium metal deposits on the negative electrode.

Compared with the battery C1, the batteries (A1 and A2) of the present embodiment had a lower gas generation rate. This is considered to be because the separator of the batteries A1 and A2 included the first and second layers described above.

Comparing the battery A1 with the battery A2, the gas generation rate of the battery A1 was low. This suggests that it is preferable to use a layer containing polymer (PL) as the second layer.

INDUSTRIAL APPLICABILITY

The present disclosure can be utilized for lithium secondary batteries.

REFERENCE SIGNS LIST

10 Positive Electrode
11 Positive Electrode Current Collector
12 Positive Electrode Active Material Layer
20 Negative Electrode
21 Negative Electrode Base
22 Lithium Metal
30 Separator
31 Substrate
31*a* First Side
31*b* Second Side
32 First Layer
33 Second Layer
40 Electrode Group
100 Lithium Secondary Battery
S Space

The invention claimed is:

1. A lithium secondary battery comprising a positive electrode, a negative electrode, a separator disposed between the positive electrode and the negative electrode, and a nonaqueous electrolyte, wherein the negative electrode is an electrode in which lithium metal deposits during charging and the lithium metal dissolves during discharging, the separator includes:

a substrate;

a first layer formed directly on a first side of the substrate, the first side facing the negative electrode; and a second layer formed directly on a second side of the substrate, the second side facing the positive electrode, the first layer includes particles of phosphate containing lithium, the second layer is composed only of a polymer, and the polymer includes at least one selected from the group consisting of aromatic polyamide, aromatic polyimide, and aromatic polyamide-imide.

2. The lithium secondary battery of claim 1, wherein the phosphate is lithium phosphate.

3. The lithium secondary battery of claim 1, wherein the content of the particles of the phosphate in the first layer is in the range of 85 mass % to 99 mass %.

4. The lithium secondary battery of claim 1, wherein the average particle size of the particles of the phosphate is in the range of 0.1 μm to 1.0 μm.

5. The lithium secondary battery of claim 1, wherein the thickness of the first layer is in the range of 0.2 μm to 10 μm and the thickness of the second layer is in the range of 0.2 μm to 10 μm.

6. The lithium secondary battery of claim 1, wherein the nonaqueous electrolyte contains lithium ions and anions, and the anions include at least anions of an oxalate complex.

7. The lithium secondary battery of claim 6, wherein the anions of the oxalate complex is bis(oxalate)borate anions.

8. The lithium secondary battery of claim 1, wherein the substrate is made of a polymer.

9. The lithium secondary battery of claim 1, wherein the second layer is composed only of aromatic polyamide.

10. The lithium secondary battery of claim 9, wherein the substrate is made of a polymer.

* * * * *